United States Patent [19]

Hankes

[11] Patent Number: 5,388,061
[45] Date of Patent: Feb. 7, 1995

[54] PORTABLE COMPUTER FOR ONE-HANDED OPERATION

[76] Inventor: Elmer J. Hankes, 1768 Colfax Ave. South, Minneapolis, Minn. 55403

[21] Appl. No.: 117,995

[22] Filed: Sep. 8, 1993

[51] Int. Cl.$^6$ .............................................. G06F 1/00
[52] U.S. Cl. ............................................... 364/708.1
[58] Field of Search .................. 364/708.1, 709.12; 400/489, 715, 488; 235/145 R, 146; 341/22

[56] References Cited

U.S. PATENT DOCUMENTS

| | | | |
|---|---|---|---|
| D. 311,522 | 10/1990 | Knight | D14/106 |
| 3,940,758 | 2/1976 | Margolin | 364/708.1 |
| 3,967,273 | 6/1976 | Knowlton | 340/365 |
| 4,042,777 | 8/1977 | Bequaert et al. | 179/79 |
| 4,062,181 | 12/1977 | Zurcher | 364/708.1 X |
| 4,483,634 | 11/1984 | Frey et al. | 400/489 |
| 4,547,860 | 10/1993 | Lapeyre | 364/709 |
| 4,737,980 | 4/1988 | Curtin et al. | 379/97 |
| 4,825,395 | 4/1989 | Kinser, Jr. et al. | 364/708.1 |
| 4,849,732 | 7/1989 | Dolenc | 341/20 |
| 4,891,777 | 1/1990 | Lapeyre | 364/706 |
| 4,917,516 | 4/1990 | Retter | 400/489 |
| 5,003,503 | 3/1991 | Lapeyre | 364/710.12 |
| 5,062,070 | 10/1991 | Lapeyre | 364/709.16 |
| 5,124,940 | 6/1992 | Lapeyre | 364/709.16 |
| 5,184,315 | 2/1993 | Lapeyre | 364/709.16 |
| 5,278,779 | 1/1994 | Conway et al. | 364/708.1 |

OTHER PUBLICATIONS

Pechanek et al, "Briefcase-portable textwriter with 100-key full-size keyboard" IBM Tech Disclosure Bull. vol. 27, No. 4A Sep. 1984, pp. 2002–2004.

*Primary Examiner*—Tan V. Mai
*Attorney, Agent, or Firm*—Moore & Hansen

[57] ABSTRACT

A portable computer with at least one reduced-key keypad for one-handed operation is disclosed. The preferred embodiment of the portable computer includes two data display screens for displaying data from two programs running simultaneously. It also includes two keypads, both of which are capable of entering the full range of alphanumeric characters and software control commands.

13 Claims, 3 Drawing Sheets

PORTABLE COMPUTER FOR ONE-HANDED OPERATION

BACKGROUND OF THE INVENTION

1. Technical Field

The present invention relates generally to portable computers, and particularly to portable computers that are small, lightweight and capable of one-handed operation.

2. Background Information

Portable computers have become increasingly common as the various components of computing technology are miniaturized. For example, powerful processors with minimal power requirements are becoming more commonplace, enabling computing power rivaling that of a desktop machine to be carried to remote locations and run off of a battery for several hours at a time. Similarly, displays of increasing clarity and resolution are also becoming available, enabling a relatively small screen to display a great deal of information without excessive eyestrain on the part of the computer user.

Further miniaturization is enabled when smaller keyboards are used. Indeed, the keyboard is in some cases the element of the computer that restricts the lower limits of downsizing. By reducing the number of keys required to address the full range of functions available from modern computer programs, the size of the portable computer itself may be greatly reduced without sacrificing any computing performance.

The approach taken by most portable computer manufacturers in the past has been to provide a keyboard with the full complement of keys, but to make the keys smaller and put them closer together. This approach results in awkward operation because a higher level of dexterity is required of the user, especially if the user is an adult with large fingers. Making the keys smaller and placing them closer together can result in the user's fingers running into each other and competing for the same space in the area immediately above the keyboard. When two hands are required for proper computer operation, as is virtually always the case, this situation is exacerbated.

Since the keyboards of present portable computers are limited in how small they can be made by the number of keys they require, it follows that the overall size and weight of the computers themselves are also similarly limited.

Additionally, traditional portable computers, which require two handed operation, must be set on a surface such as a table or the lap of the computer user to allow efficient operation. If the computer user attempts, for example, to cradle the computer in an arm while operating the keyboard with the other hand, the resulting operation is slow and cumbersome, at best.

While so-called hand-held computers operating on pen-based systems that require the use of a stylus and handwriting recognition software are presently available, the functionality of these systems is severely limited by the lack of available software that supports them. In addition, presently available hand-writing recognition software takes much time and effort to get used to, and the software, once it learns the handwriting of a particular user, does not recognize that of additional users.

The portable computer of the present invention overcomes difficulties described above and affords other features and advantages heretofore not available.

SUMMARY OF THE INVENTION

The present invention is a portable computer that uses a keyboard capable of addressing the full range of computer functions with a limited number of keys and one-handed operation. The preferred keyboard for one-handed operation is disclosed in Applicant's co-pending application Ser. No. 08/974,223, filed Jun. 9, 1993. Various embodiments of the portable computer may include a monitor disposed in different locations and positions on the central processing unit, including on the bottom thereof.

It is an object of this invention to provide a portable computer that allows easy operation in locations that may not permit the use of traditional portable computers. Rather than requiring a flat resting surface for proper operation, the present portable computer may easily be operated while being held in one or both hands of the operator.

It is a further object of this invention to provide a portable computer for one-handed operation that incorporates a small keypad, the smaller requirements of which permits down-sizing of the entire computer housing, resulting in a smaller unit that further enhances portability due to smaller size and lighter weight. Despite this miniaturization, computer performance need not suffer, since the processor and memory of a traditional portable computer may still be incorporated into the computer of the present invention. Furthermore, full functionality may be obtained with presently available expansion slots and ports. And as data storage hardware and communications peripherals develop, handheld portable computers of the present invention will rival present large desktop computers for processing power and functionality.

Other objects and advantages of the invention will become apparent from the following detailed description and from the appended drawings in which like numbers have been used to describe like parts throughout the several views.

DESCRIPTION OF THE PREFERRED EMBODIMENT

Figure 1:
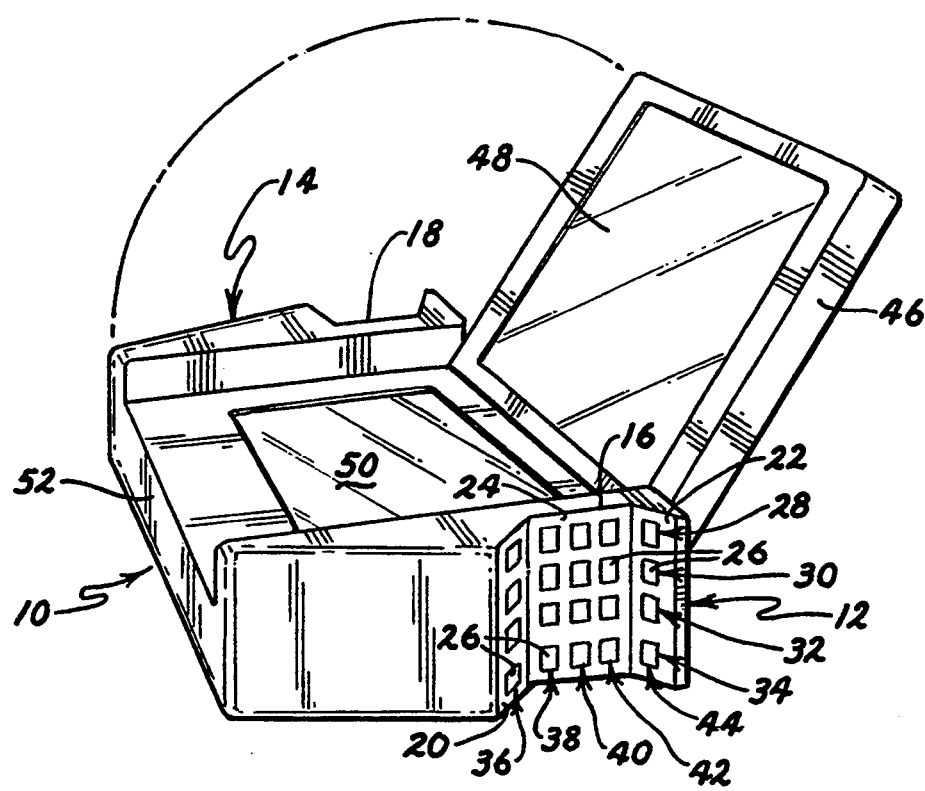
FIG. 1 is a perspective view of the preferred embodiment of the present invention with the hinged upper screen portion in the open position.
Figure 2:
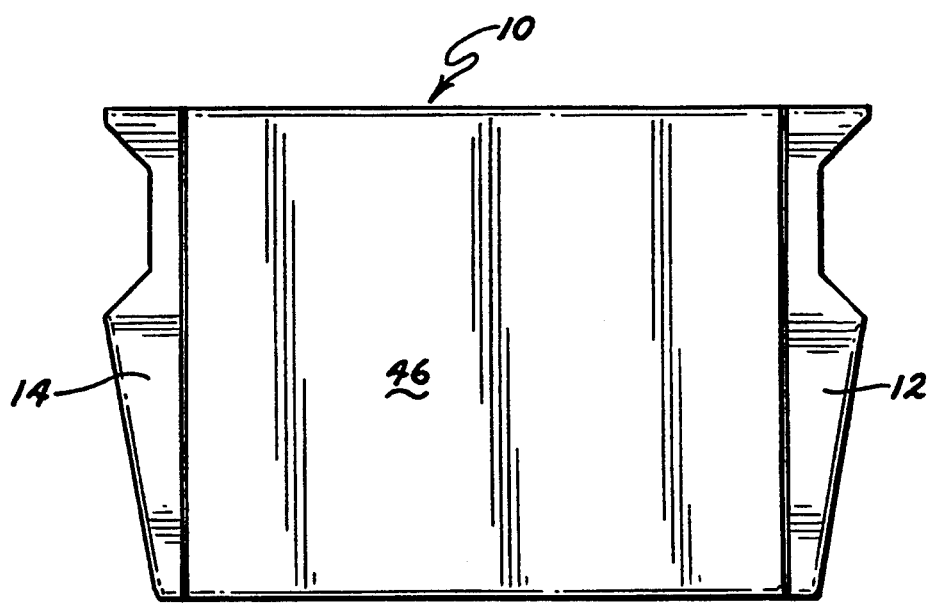
FIG. 2 is a top view of the preferred embodiment of the present invention with the hinged upper screen portion in the closed position.

With reference to the drawings, and in particular to FIG. 1, the portable computer for one-handed operation is generally indicated by reference numeral 10. For convenience, it is preferred that the computer 10 be equipped with identical first and second data entry terminals 12, 14 for controlling the operation of the computer. Each data entry terminal 12, 14 is by itself capable of controlling the full range of available functions of the computer 10. However, the presence of two such data entry terminals permits one, for example, to be dedicated to data input while the other is dedicated to cursor control. Data entry terminals 12, 14 each include first and second keypad portions 16, 18, respectively, which project from the right and left sides of computer 10. When using computer 10, the user grasps first data entry terminal 12 between the thumb and fifth finger of their right hand while grasping second data entry terminal 14 between the thumb and fifth finger of their left hand. Data input is accomplished by operating first and second data entry terminals 12, 14 with the three middle fingers of the two hands, respectively.

As may be seen, data entry terminals 12, 14 include keypad portions 16, 18 having a first obtuse, generally upwardly angled segment 20, a second obtuse, generally upwardly angled segment 22, and an intermediate segment 24. All three surfaces of first and second keypad portions 16, 18 are flat. Keypad portions 16, 18 preferably include twenty keys 26, arranged in four columns 28, 30, 32 and 34, respectively, and five rows 36, 38, 40, 42 and 44, respectively. Columns 28, 30 and 32 are preferably spaced an equal distance apart one from another, while column 34 is preferably spaced a distance somewhat greater from column 32. The distance between column 32 and column 34 should be large enough to be detectable to the touch of a keyboard operator.

As shown in FIG. 1, row 36 is positioned on first angled segment 20 of keypad portions 16, 18. Rows 38, 40 and 42 are positioned on intermediate segment 24, and row 44 is positioned on second angled segment 22. Keystrokes of predetermined combinations of keys result in alphanumeric characters or other software commands being transmitted to the program in use on the computer at the time. Similarly, predetermined keystrokes combinations may result in cursor movement or other functions, depending on the selectable mode the keypad is set for at the time.

The preferred embodiment of portable computer 10 also includes a cover portion 46 including a first display screen 48. A second display screen 50 is also preferably included, and is positioned on the base 52 of portable computer 10, to which cover portion 46 is hingedly attached.

Within base 52 of portable computer 10 are located the elements required for operation of a portable computer, including a battery and the motherboard, to which may be attached a processor, memory chips, and other necessary components and circuitry. Base 52 may also include input/output ports that permit access to external components, such as a larger monitor, a printer, or an external floppy or hard disk drive. Finally, base 52 may also include additional ports for connection of removable internal devices, such as modems and removable hard drives. Additionally, presently undeveloped components may also be permitted access to the computer through ports or other means, without departing from the basic structure of portable computer 10.

In use, portable computer 10 may be held in both hands of the operator, with the right hand entering data or operating instructions on first keypad 16 and the left hand entering data or operating instructions on second keypad 18. If preferred, portable computer 10 may be rested on a support surface, such as the operator's knee if the operator is seated, but suitable performance may be obtained while holding the computer by grasping first and second data entry terminals 12, 14. First and second data display screens 48, 50 permit the operator to observe the progress or status of two separate programs simultaneously while operating the computer. For example, the operator may be inputting data into a word processing program on first display screen 48 while e-mail messages or data from a remote database being accessed via modem is displayed on second display screen 50.

Figure 3:
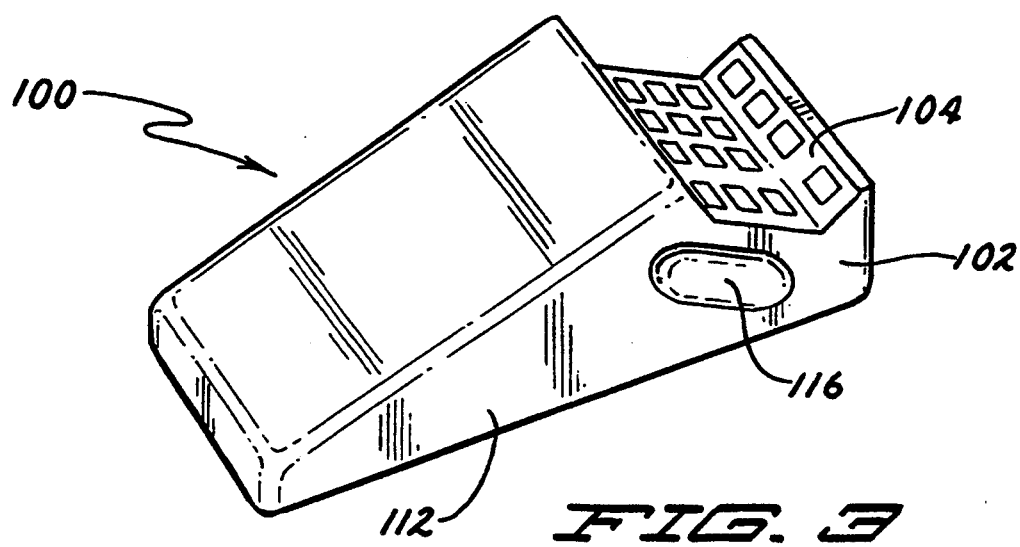
FIG. 3 is a perspective view of a second embodiment of the present invention.
Figure 4:
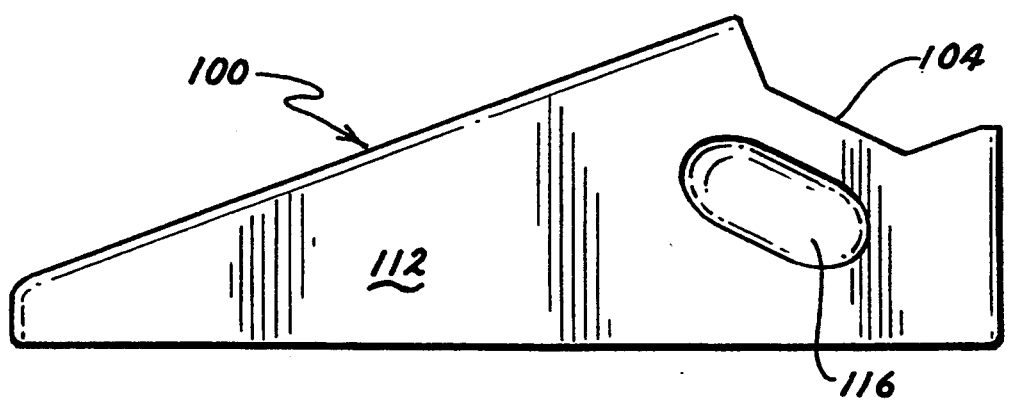
FIG. 4 is a right side view of the second embodiment of the present invention.
Figure 5:
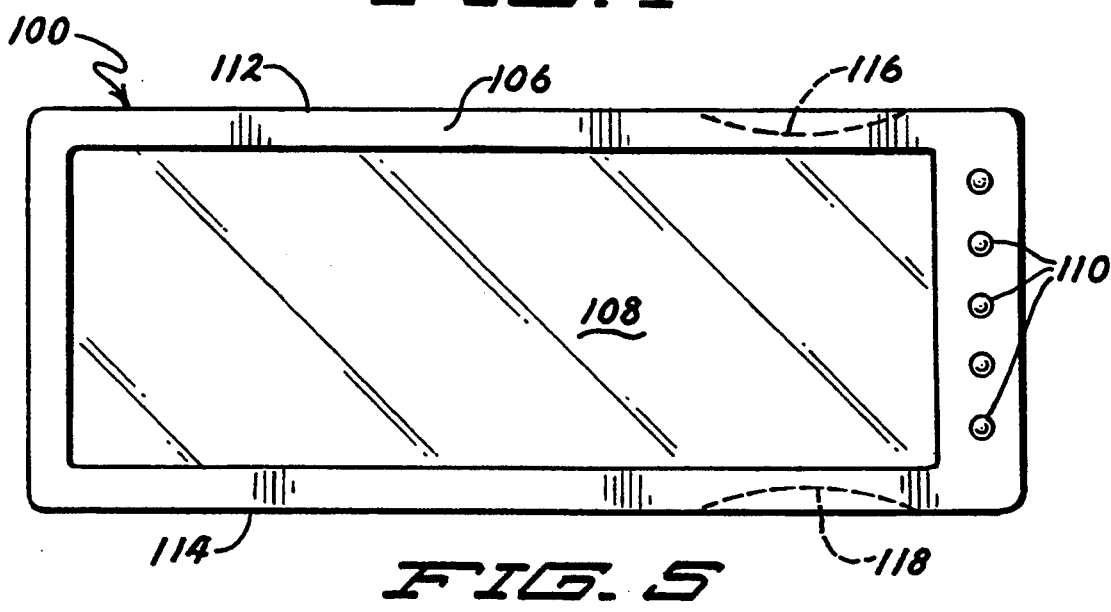
FIG. 5 is a bottom view of the second embodiment of the present invention showing the display screen thereof.

FIGS. 3, 4 and 5 illustrate a second embodiment 100 of the portable computer for one-handed operation. As with the other embodiments, computer 100 includes a data entry terminal 102 having a keypad portion 104. Keypad portion 104 of computer 100 is identical to that of first and second keypad portions 16, 18 of the embodiment illustrated in portable computer 10. On the bottom 106 of computer 100 is a single display screen 108. A number of indicator lights 110 may be positioned adjacent display screen 108. These lights may serve a number of different functions, including indicating whether a storage disk is being accessed or which mode keypad 104 is currently programmed to operate in. As indicated earlier, the complete range of computer functions may be addressed from the reduced-key keypad, allowing the keypad to be shifted between, for example, cursor mode and data entry mode. Right and left sides 112, 114 of computer 100 preferably include first and second indents 116, 118, respectively. Indents 116, 118 serve as locators for holding computer 100 during use. Preferably, when held, for example, by the operator's right hand, the operator's thumb would be positioned in indent 118 and their fifth finger would be positioned in indent 116. Computer 100 is, however, operable by either the left or right hand. As with preferred embodiment 10, personal computer 100 may include a number of ports, slots or other input/output terminals for data transfer or access to external devices. In use, portable computer 100 may be held in either hand of the user, with the three middle fingers of that hand entering data on keypad 104. If preferred, computer 100 may be turned upside down during data entry for easy viewing of data display screen 108.

Figure 6:
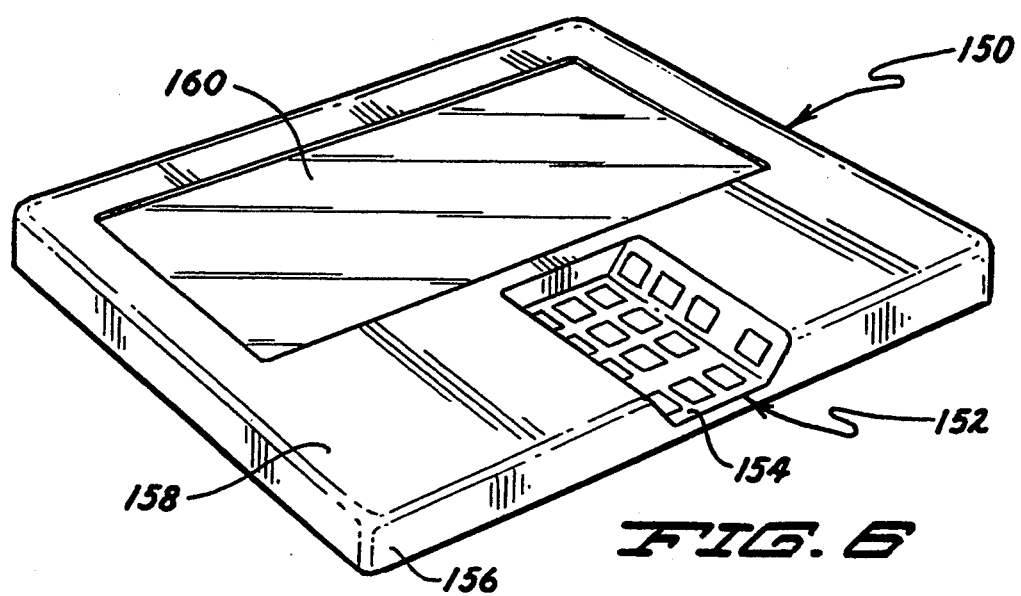
FIG. 6 is a perspective view of a third embodiment of the present invention.
Figure 7:
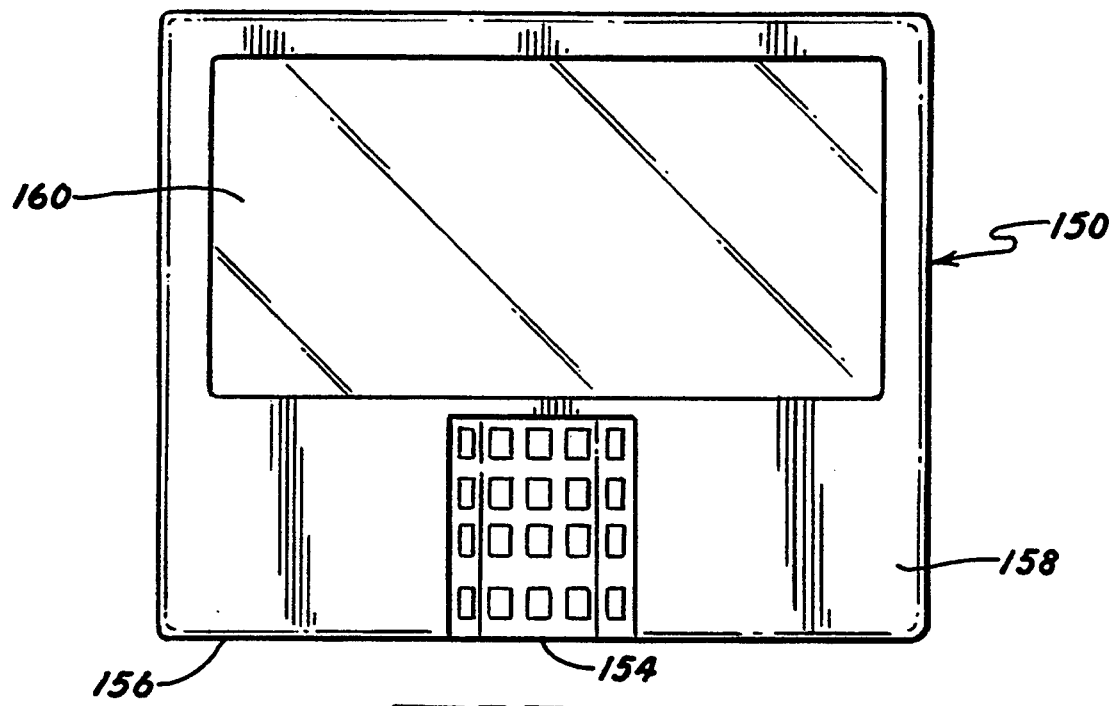
FIG. 7 is a top view of the third embodiment of the present invention.
Figure 8:
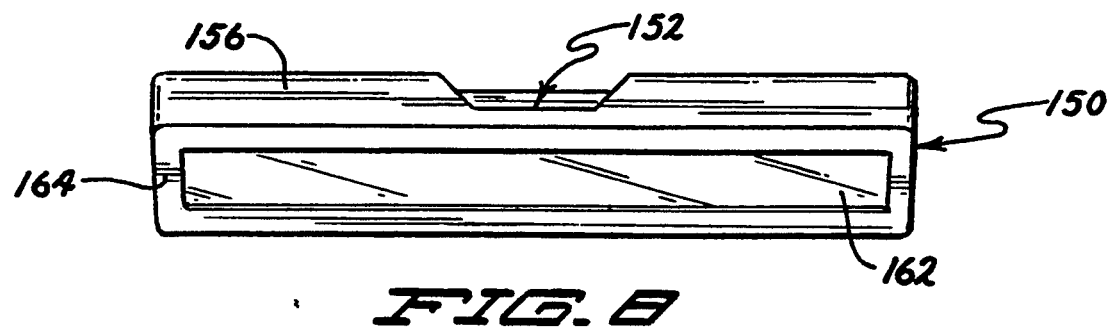
FIG. 8 is a right side perspective view of the third embodiment of the present invention, showing the display screen thereof and the location of the integral bent keyboard.

FIGS. 6, 7 and 8 illustrate a third embodiment 150 of the portable computer for one-handed operation. This tablet-style portable computer 150 again incorporates a data entry terminal 152 with a keypad 154 identical to that of the other two embodiments. Data entry terminal 152 is preferably positioned along the right side 156 of tablet-style computer 150. Preferably positioned on the top or upper surface 158 of computer 150 is a data display screen 160. Alternatively, as illustrated in FIG. 8, a data display screen 162 may be positioned on the bottom or lower surface 164 of computer 150. In use, tablet-style portable computer 150 may be held in a number of positions for convenient use. For example, with data display 160 positioned on upper surface 158, portable computer 150 may be held against the waist of the user by the left hand, positioned at the upper edge of the computer, while the right hand enters data through keypad 154. With data display 162 located on bottom surface 164, portable computer 150 may be positioned on the right forearm of the user while data is entered through keypad 154, which would be facing downward, away from the user.

While the preferred embodiments of the invention have been described, it should be understood that various changes, adaptations and modifications may be made therein without departing from the spirit of the invention and the scope of the appended claims.

What is claimed is:

1. A portable computer having a data processor, comprising:
    at least one keypad having a multiplicity of manually actuable keys, said keypad including a generally flat intermediate segment having a lower edge and an upper edge, a first angled segment projecting generally upwardly from said upper edge of said intermediate segment and forming a first obtuse angle with said intermediate segment, and a second angled segment projecting generally upwardly from said lower edge of said intermediate segment, said second angled segment forming a second obtuse angle with said intermediate segment and positioned generally opposably to said first angled segment; and
    at least one data display screen for viewing data resulting from the keypad and computing operations of the portable computer.

2. A portable computer having a data processor, comprising:
    a base member containing the data processor;
    a first keypad mounted to said base member, said first keypad having a multiplicity of manually actuable keys, said keypad including a generally flat intermediate segment having a lower edge and an upper edge, a first angled segment projecting generally upwardly from said upper edge of said intermediate segment and forming a first obtuse angle with said intermediate segment, and a second angled segment projecting generally upwardly from said lower edge of said intermediate segment, said second angled segment forming a second obtuse angle with said intermediate segment and positioned generally opposably to said first angled segment; and
    a first data display screen for viewing data resulting from the keypad and computing operations of the portable computer, said first data display screen being connected to said base member.

3. A portable computer as described in claim 2, wherein:
    said base member includes a top side and a bottom side, a left side and a right side;
    said first keypad projects outwardly from said top side of said base member; and
    said first data display screen is mounted on and integral with said bottom side of said base member.

4. A portable computer as described in claim 3, further comprising:
    a first indent in said right side of said base member; and
    a second indent in said left side of said base member, whereby a user of the portable computer grasp the portable computer by placing the fingertips of their thumb and little finger in said first and second indents for grasping the portable computer during use.

5. A portable computer having a data processor, comprising:
    a base member containing the data processor;
    a first keypad mounted to said base member, said first keypad having a multiplicity of manually actuable keys, said keypad including an intermediate segment, a first angled segment projecting generally upwardly from and forming a first obtuse angle with said intermediate segment, and a second angled segment projecting generally upwardly from an opposing portion of said intermediate segment, said second angled segment forming a second obtuse angle with said intermediate segment;
    a first data display screen for viewing data resulting from the computing operations of the portable computer, said first data display screen being connected to said base member;
    a second keypad mounted to said base member, said second keypad having a multiplicity of manually actuable keys, said second keypad including an intermediate segment, a first angled segment projecting generally upwardly from and forming a first obtuse angle with said intermediate segment, and a second angled segment projecting generally upwardly from an opposing portion of said intermediate segment, said second angled segment forming a second obtuse angle with said intermediate segment; and
    a second data display screen for viewing data resulting from the computing operations of the portable computer, said second data display screen being connected to said base member.

6. A portable computer as described in claim 5, wherein:
    said second data display screen is mounted on and integral with said base member.

7. A portable computer as described in claim 6, further comprising:
    a cover member hingedly attached to said base member, said first data display screen being mounted on and integral with said cover member.

8. A portable computer as described in claim 7, wherein:
    said base member includes a left side and a right side;
    said first keypad projects outwardly from said right side of said base member; and
    said second keypad projects outwardly from said left side of said base member.

9. A portable computer as described in claim 5, wherein:
    said base member includes a left side and a right side;
    said first keypad projects outwardly from said first side of said base member; and
    said second keypad projects outwardly from said second side of said base member.

10. A portable computer as described in claim 9, further comprising:
    a cover member hingedly attached to said base member, said first data display screen being mounted on and integral with said cover member.

11. A portable computer as described in claim 10, wherein:
    said second data display screen is mounted on and integral with said base member.

12. A portable computer having a data processor, comprising:

a base member containing the data processor;

a first keypad mounted to said base member, said first keypad having a multiplicity of manually actuable keys, said keypad including an intermediate segment, a first angled segment projecting generally upwardly from and forming a first obtuse angle with said intermediate segment, and a second angled segment projecting generally upwardly from an opposing portion of said intermediate segment, said second angled segment forming a second obtuse angle with said intermediate segment;

a first data display screen for viewing data resulting from the computing operations of the portable computer, said first data display screen being connected to said base member;

said base member includes a top side and a bottom side;

said first keypad projects outwardly from said top side of said base member; and said first data display screen is mounted on and integral with said top side of said base member.

13. A portable computer as described in claim 12, further comprising:

a second data display screen mounted on and integral with said bottom side of said base member.

* * * * *